TELEPHONE ANSWERING AND MESSAGE RECORDING DEVICES

Filed Nov. 16, 1951 12 Sheets-Sheet 1

INVENTOR.
EMMETT R. SALZBERG
BY
[signature]
ATTORNEY.

INVENTOR.
EMMETT R. SALZBERG
BY
ATTORNEY.

TELEPHONE ANSWERING AND MESSAGE RECORDING DEVICES

Filed Nov. 16, 1951 12 Sheets-Sheet 3

INVENTOR.
EMMETT R. SALZBERG
BY
ATTORNEY.

INVENTOR.
EMMETT R. SALZBERG
BY A. J. Nydick
ATTORNEY.

TELEPHONE ANSWERING AND MESSAGE RECORDING DEVICES

Filed Nov. 16, 1951 12 Sheets-Sheet 5

INVENTOR.
EMMETT R. SALZBERG
ATTOREY.

INVENTOR.
EMMETT R. SALZBERG
BY
ATTORNEY.

July 2, 1957 E. R. SALZBERG 2,798,117

TELEPHONE ANSWERING AND MESSAGE RECORDING DEVICES

Filed Nov. 16, 1951 12 Sheets-Sheet 7

INVENTOR.
EMMETT R. SALZBERG

ATTORNEY.

INVENTOR.
EMMETT R. SALZBERG
[signature]
ATTORNEY.

TELEPHONE ANSWERING AND MESSAGE RECORDING DEVICES

INVENTOR.
EMMETT R. SALZBERG
BY
ATTORNEY.

INVENTOR.
Emmett R. Salzberg
BY
A. J. Nydick
ATTORNEY.

TELEPHONE ANSWERING AND MESSAGE RECORDING DEVICES

INVENTOR.
EMMETT R. SALZBERG
BY
[signature]
ATTORNEY.

TELEPHONE ANSWERING AND MESSAGE RECORDING DEVICES

INVENTOR.

EMMETT R. SALZBERG

BY

ATTORNEY.

2,798,117
Patented July 2, 1957

2,798,117

TELEPHONE ANSWERING AND MESSAGE RECORDING DEVICES

Emmett R. Salzberg, New York, N. Y.

Application November 16, 1951, Serial No. 256,759
8 Claims. (Cl. 179—6)

This invention relates to telephone answering and message recording devices. In particular, it is directed to a device which answers the telephone and actuates a recording instrument.

Although there have been many proposals in respect of devices for answering the telephone and recording messages, such devices are generally expensive, difficult for the average person to operate, bulky, and delicate in construction so that they are susceptible to impairment in function.

Such devices have also involved rather complex electronic circuits and elements.

Accordingly, such prior devices have been in the class of luxury items.

It is an object of this invention to provide a device for answering the telephone and to effectuate the recording of the message which is characterized by the following features:

Marked simplicity of construction.
Low cost of manufacture.
Ruggedness, so as to withstand considerable shocks and abuses.
Ready adaptability for interconnection with recording instruments, or integration therewith.
Adaptability for simple change of announcements so that the varying character and/or duration of the subscriber's absence may be reflected easily.
Usability without physical integration or interconnection with the telephone instrument and circuits, making for ease, economy and absence of continued attention on installation.

In another embodiment of the invention, the characteristic of integration in the telephone instrument per se with little increase in the size of the telephone.

The essential aspects of the foregoing objectives may be achieved by:

A completely independent and movable device that provides alternatively a base for the telephone instrument with which it is associated, or a device that is embodied in or integrated with a telephone instrument.

In its essential aspects the non-integrated device comprises a combination of members and circuits by which the acoustic energy produced by the telephone bell is converted into electrical energy which is amplified to effectuate:

The elevation of the telephone hand set, or similar member.

The operation of a device that announces the absence of the subscriber.

The supply of operating voltage to a recording machine.

In another of its aspects the invention embodies a provision for the easy insertion and removal of a series of recorded announcements.

In the completely integrated form of this invention elevation of the hand set is eliminated.

A fuller understanding of the invention, the objects and advantages thereof above set forth, as well as further objects and advantages will become apparent from the following more detailed description of this invention taken in connection with the accompanying drawing of illustrative embodiments thereof wherein:

Fig. 31 is a diagrammatic illustration of the circuit of the instrument illustrated in Fig. 1.

Fig. 32 is a diagrammatic illustration of the circuit of an integrated device embodying this invention.

Figure 1:
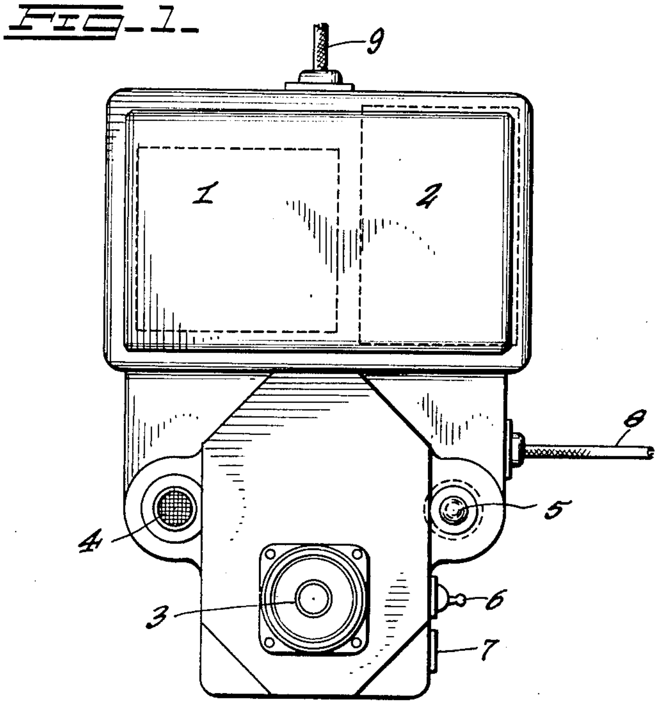
Fig. 1 is a top plan view of a device embodying this invention that provides a seat for a telephone associated therewith.
Figure 2:
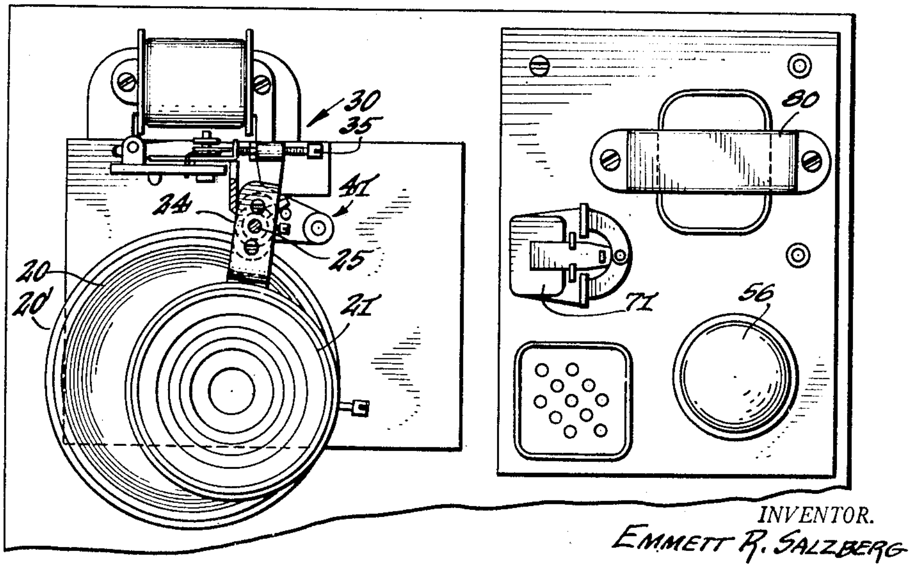
Fig. 2 is a fragmentary portion of the device illustrated in Fig. 1 showing the rearward portion thereof with the cover removed.
Figure 17:
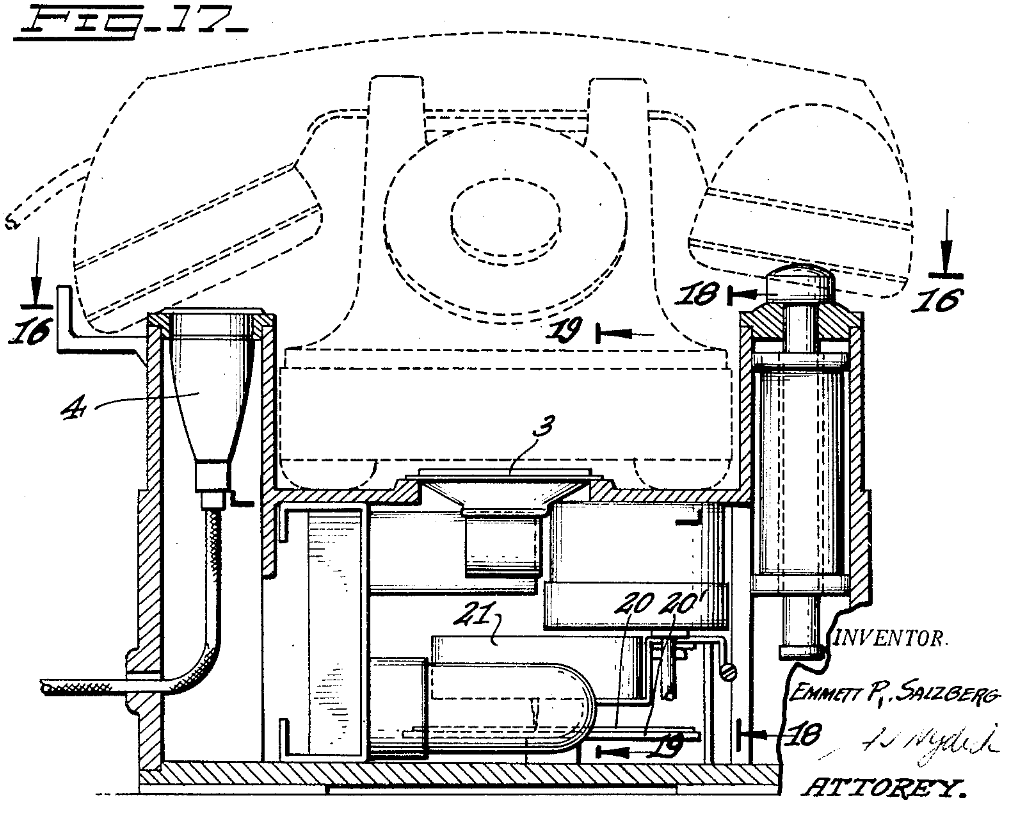
Fig. 17 is a sectional view of the device illustrated in Fig. 16, and, in phantom, a telephone instrument seated thereon.
Figure 18:
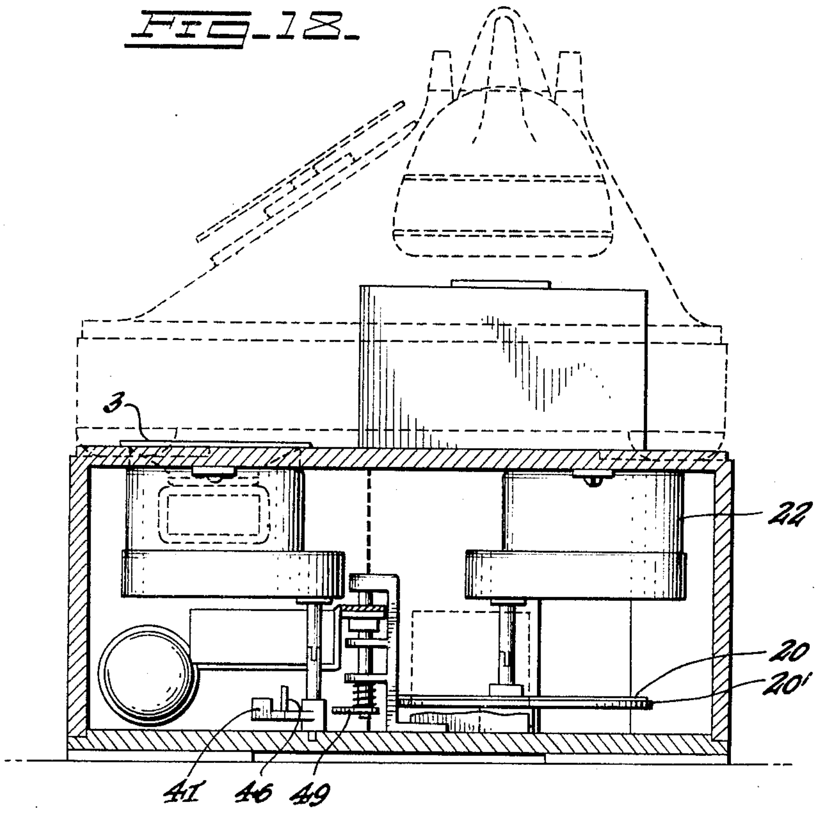
Fig. 18 is a sectional view of the device illustrated in Fig. 17, taken on the line 18—18 thereof.
Figure 19:
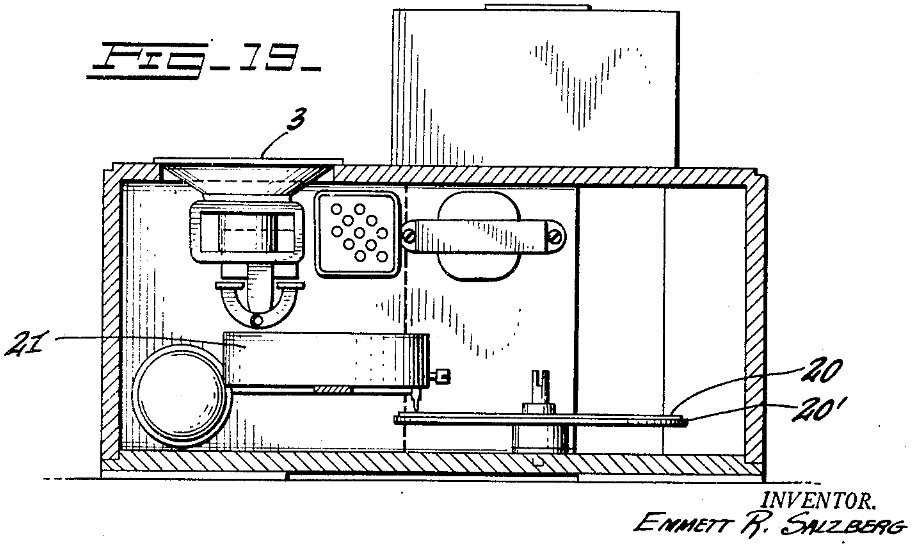
Fig. 19 is a sectional view of the structure illustrated in Fig. 17, taken on the 19—19 line thereof.

Referring to Fig. 1, numeral 1 designates the general position of the announcing mechanism, more specifically to be described hereafter. The numeral 2 designates an amplifier assemblage (more specifically to be described hereafter) which is responsive to the acoustic energy produced by the telephone bell. Numeral 3 designates a microphone that absorbs or picks up the acoustic energy of the ringing telephone bell. Numeral 4 indicates a microphone positioned beneath the receiver or ear piece of the telephone hand set (shown, e. g., in Fig. 17), and 5 the armature of the hand set elevating solenoid.

The electric current that supplies energy to the instrument is controlled by a switch 6. At 7 is shown a receptacle into which is plugged the power cord running to a recording instrument. A line 8, connected with the microphone 4, is connected to the voice input of the recording instrument. The numeral 9 designates the power cable that supplies current (as, for example, 110 v., A. C.) to the instrument, controlled by switch 6.

Figure 3:
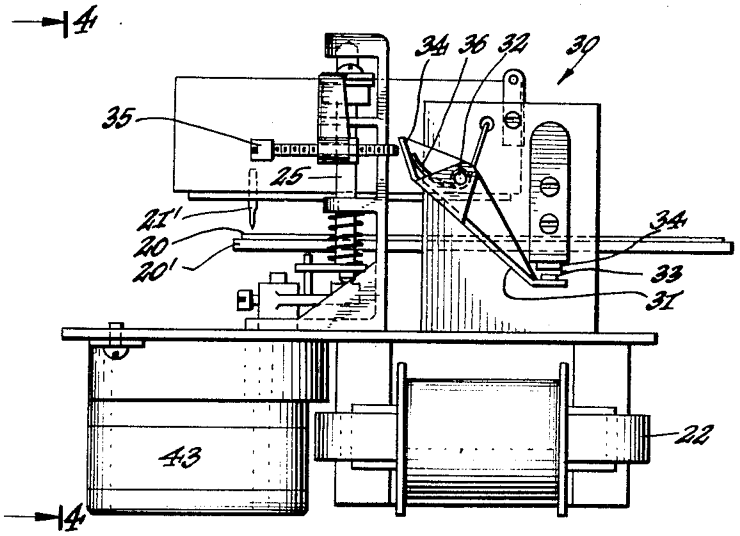
Fig. 3 is a rear elevation of the left side of the structure illustrated in Fig. 2.
Figure 4:
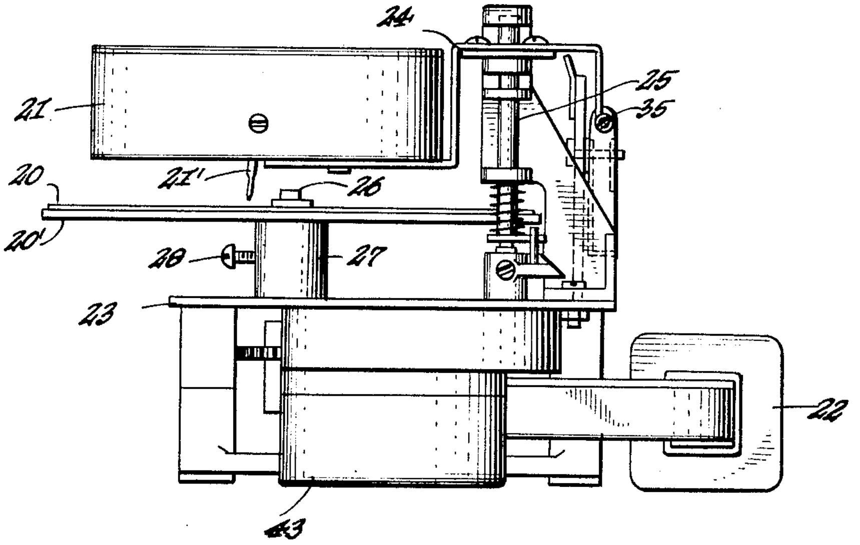
Fig. 4 is a side view of the structure illustrated in Fig. 3 taken on the line 4—4.

As shown especially in Figs. 3 and 4, the announcing mechanism is a phonograph comprising a disc or record 20, a mechanical speaker 21, and a needle 21'. The record 20 is carried by turntable 20' which is driven by an electric motor 22, positioned underneath a plate 23. The speaker 21 is mounted on a bracket 24 carried by a vertically disposed shaft 25 adapted for vertical and rotational movement. The drive shaft 26 of motor 22 is positioned within a sleeve 27 to which it is affixed by means of set screw 28.

The amplifier assemblage, shown diagrammatically in Fig. 31, comprises a transformer 55 wherein the acoustic energy absorbed by pickup 3 is amplified to a first stage, and then further amplified by the first half of a two-unit vacuum tube 56, as, for example, type 6SN7.

The device further comprises a combination of switch, relay and circuits that provide for the sequence of operations in announcing the absence of the subscriber, and recording the message received from the caller.

Figure 5:
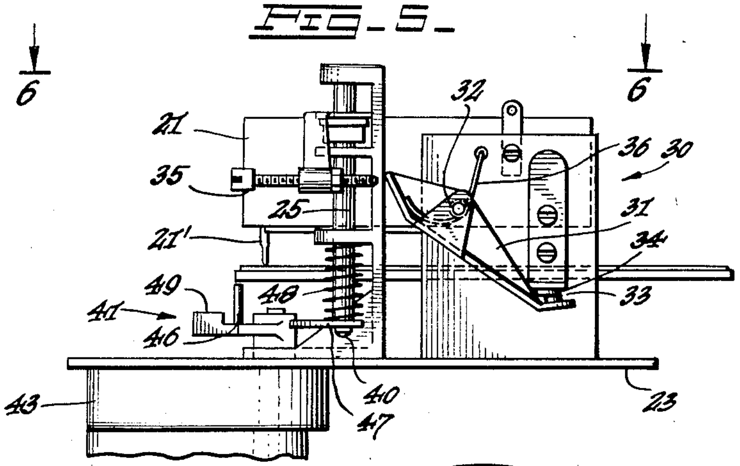
Fig. 5 is a rear view of the upper portion of the structure illustrated in Fig. 3 in an altered position.
Figures 6, 7, 8, 9, 10:
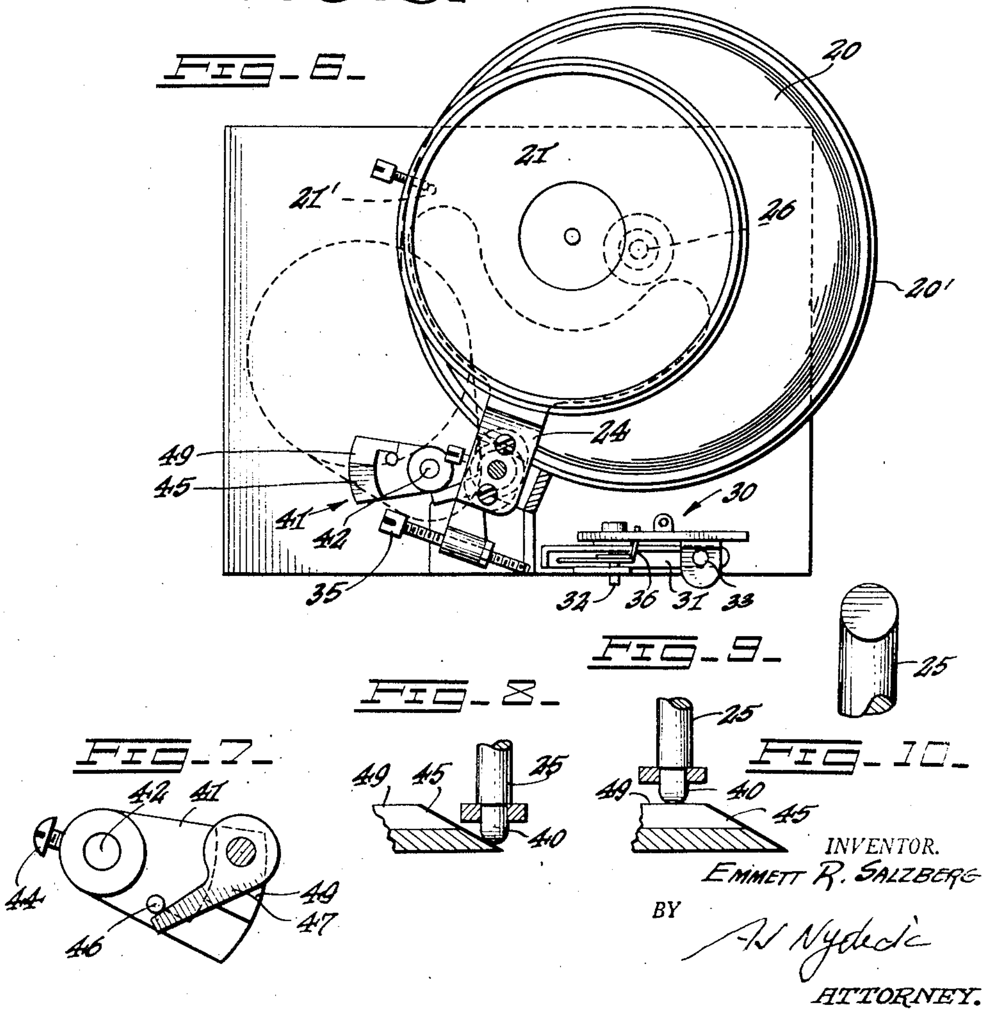
Fig. 6 is a top plan view of the structure shown in Fig. 5 showing, as one example of the possible embodiment, a phonograph record and speaker associated therewith for delivering the recorded announcement.
Fig. 7 is a top plan view showing a cam and associated pin that is driven by a motor for resetting the speaker.
Fig. 8 is a detailed view showing the association of the lower end of the speaker support shaft in contact with the sloping portion of the cam shown in Fig. 7.
Fig. 9 is a view showing the lower end of the speaker support shaft in its most elevated position resting upon the flat surface of the cam shown in Fig. 7.
Fig. 10 is a view showing the configuration of the upper end of the speaker support shaft.
Figures 11, 12, 25:
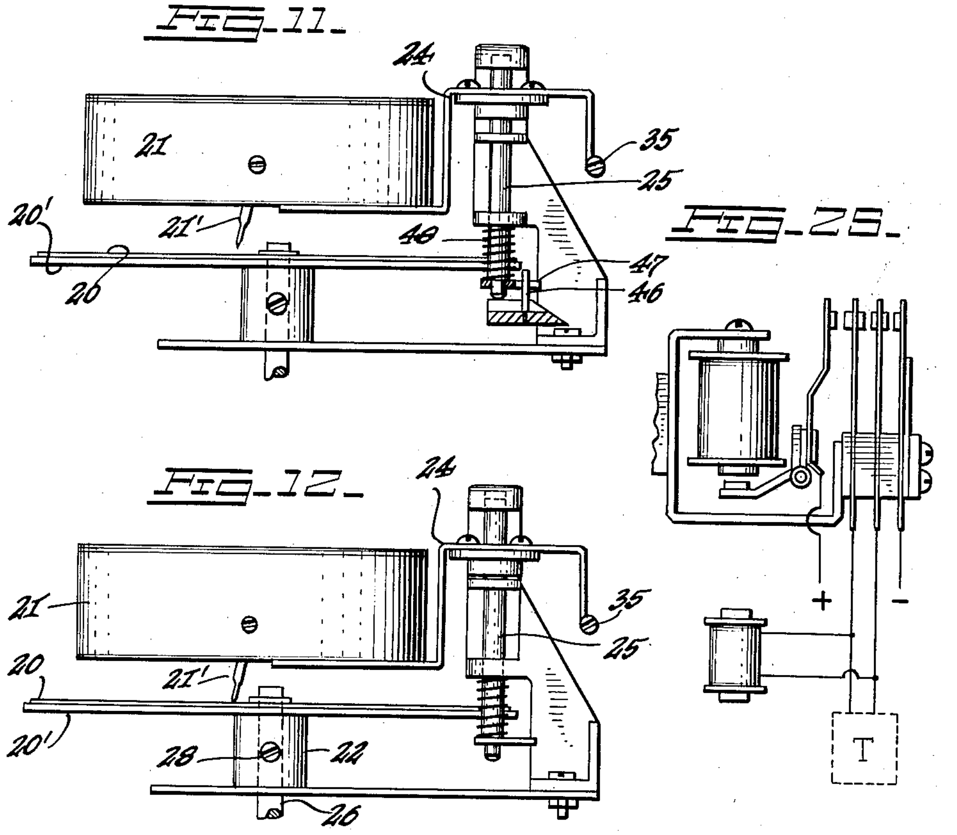
Fig. 11 shows the relative positions of the record and associated speaker, the speaker being mounted on an arm carried by a shaft, and the associated cam and its assemblage.
Fig. 12 is a view of the structure illustrated in Fig. 11, the needle of the speaker being in contact with the record.
Fig. 25 is a view showing a combination of a relay that may be used in conjunction with the basic type of switch shown in Fig. 24 in a modified integrated form of this invention.

As shown in Fig. 5, a switch assemblage that functions as a holding relay contact assembly is designated generally as 30 and comprises a blade 31 mounted on a horizontally disposed shaft 32. The blade has a contact point 33 at one end which is in cooperative disposition with a second point 34. The other end of blade 31 is actuated, at an appropriate moment in the operative cycle, by set screw 35. The blade 31 is biased by spring 36 which is wrapped around shaft 32.

The speaker support shaft is provided with a rounded lower end 40 adapted to slide upon a cam 41 which is affixed to the shaft 42 of a second motor 43, herein designated also as the speaker reset motor, by means of set screw 44. The cam is provided with a sloping face 45. The cam is also provided with a pin 46 adapted to move a dog 47 mounted on speaker shaft 25. A coil spring 48 mounted on speaker shaft 25 biases the needle 21' against the record 20.

The operation of the phonograph and holding relay assembly is as follows. Upon commencement of a cycle the lower end 40 of shaft 25 rests upon the horizontal surface 49 of the cam 41. The speaker reset motor 43 begins to rotate and carries the cam 41 out from underneath shaft 25 thereby allowing the speaker 21 to drop so that the needle 21' comes into contact with record 20 which is already rotating as hereinafter described. After the record has made a couple of rotations the speaker support bracket 24 carrying switch assembly actuating set screw 35 is moved so that said set screw is moved out of contact with blade 31 thus resulting in the closing of contacts 33 and 34.

The cam continues to turn while the record is rotating until the sloping face of the cam comes into contact with the lower end 40 of the shaft 25 and raises it so that the needle is lifted from the record. At that time the pin 46 comes into contact with dog 47 which is thereby moved thus turning the shaft 25, and thereby returning the speaker to its initial position. When the speaker is thus returned, the bracket 24 is swung around thereby moving the set screw 35 against the blade 31 and thus separating contacts 33 and 34.

Having described the mechanical parts of the apparatus, attention will now be directed more fully to the electrical elements and circuits as shown in Fig. 31.

The apparatus is connected to a 110 volts A. C. line by cable 9. The ringing of the telephone produces acoustic energy which is absorbed by pickup 3, amplified through transformer 55 and further amplified by the first half of a two-unit vacuum tube 56, as, for example, type 6SN7. Resistor 57 in this circuit acts as a parasitic suppressor. The resistor-condenser combination composed of resistor 58 and condenser 59 supplies the operating bias for the voltage amplifier (VA). The amplified voltage is developed across the resistor 60, and is supplied to the power amplifier (PA) through condenser 61 and resistor 62. Resistor 63 in conjunction with the grid of the power amplifier and resistor 62 and condenser 61 comprises the integrator for the amplified sound energy. Upon receipt of the signal, relay 70 is energized to close contacts 71. 110 volts A. C. is transmitted through contacts 71 to operate relay 73. The operation of relay 73 performs the following functions: contacts 74 supply energy to the solenoid 75, the armature 5 of which raises one end of the telephone hand set. Contacts 76 supply energy to motors 43 and 22. Motor 43 drives the speaker reset mechanism and the holding relay contact assembly 30. The purpose of this holding contact is to maintain the circuit in operation after cessation of the audible bell ringing signal. The rest of this assembly supplies the correct timing intervals. Motor 22 drives the assembly of the turntable 20'. Contacts 77 of relay 73 supply full energy to the recording device which is connected at 7, the recorder being normally supplied with a standby reduced line voltage caused by dropping resistor 63.

Filament transformer 80 supplies 63 volts, 60 cycles A. C. to the filaments of the vacuum tube 56. Resistor 81 protects the rectifier 82 which, in conjunction with capacitor 83, generates the D. C. voltage required for the operation of the voltage amplifier and power amplifier.

A recording instrument of any appropriate electrical type is connected to the outlet 7. The microphone 4 is also connected via line 8 to the voice input of the recorder which is set to record.

When current is supplied to the apparatus of this invention by the closure of switch 6, current is thus simultaneously supplied to the recording instrument at a low voltage but sufficient only to keep the tubes of the recorder warm. When the apparatus of this invention is operating, full current is supplied to the recorder so that the incoming message can be received and recorded, that being accomplished by the sound emanating from the earpiece of the hand set which impinges on the microphone 4.

Figure 13:
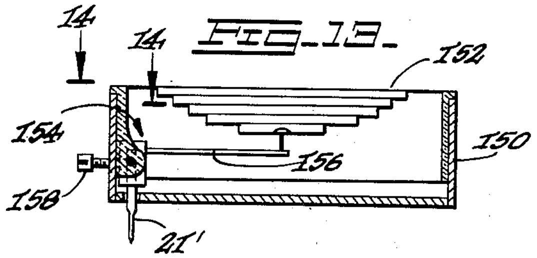
Fig. 13 is a vertical cross-sectional view through the speaker illustrated in Figs. 11 and 12.
Figure 15:
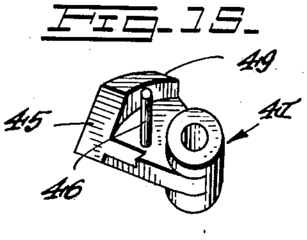
Fig. 15 is a perspective view of the cam illustrated in Fig. 7.
Figure 14:
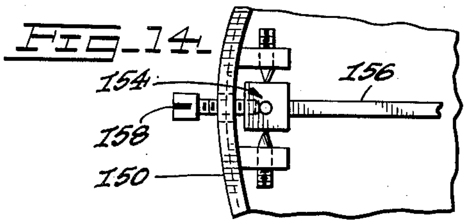
Fig. 14 is a sectional view of the portion of the speaker illustrated in Fig. 13 taken on the line 14—14 thereof.
Figure 16:
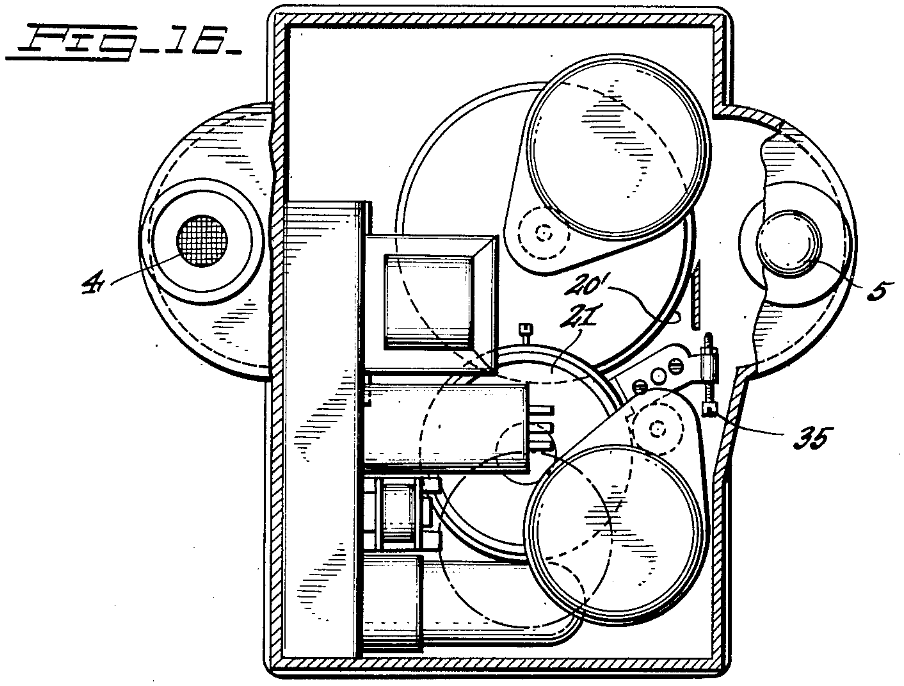
Fig. 16 is a top plan view of a device built in accordance with this invention showing the general relationship of the major components.

As shown in Figs. 13 and 14, the speaker comprises a cup-shaped assemblage of cardboard 150, on the open end of which is affixed a fiber diaphragm 152, the latter being connected to the needle holding element 154 by a rod 156. The needle is positioned by means of set screw 158.

Figure 20:
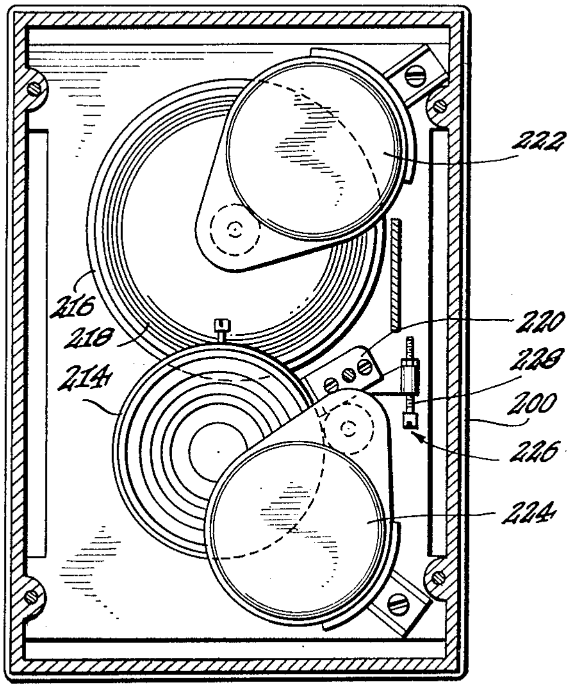
Fig. 20 is a top plan view of a telephone instrument in which this invention is integrated, said view showing in specific but purely illustrative embodiment some of the principal components thereof.
Figure 21:
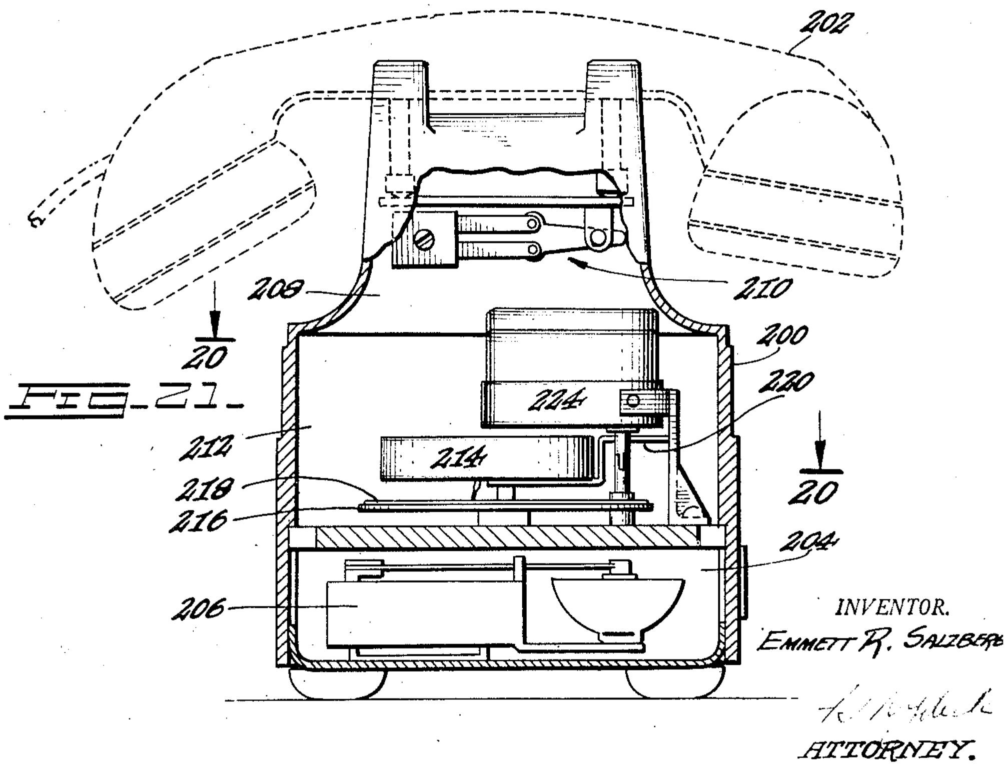
Fig. 21 is a vertical cross-sectional view of the structure illustrated in Fig. 20.

Referring now to Fig. 20 and the associated figures there is shown a telephone in which this invention is completely integrated. This embodiment eliminates the elevation of the hand set, and also eliminates the amplifier of the acoustic energy of the bell.

Figures 23, 24:
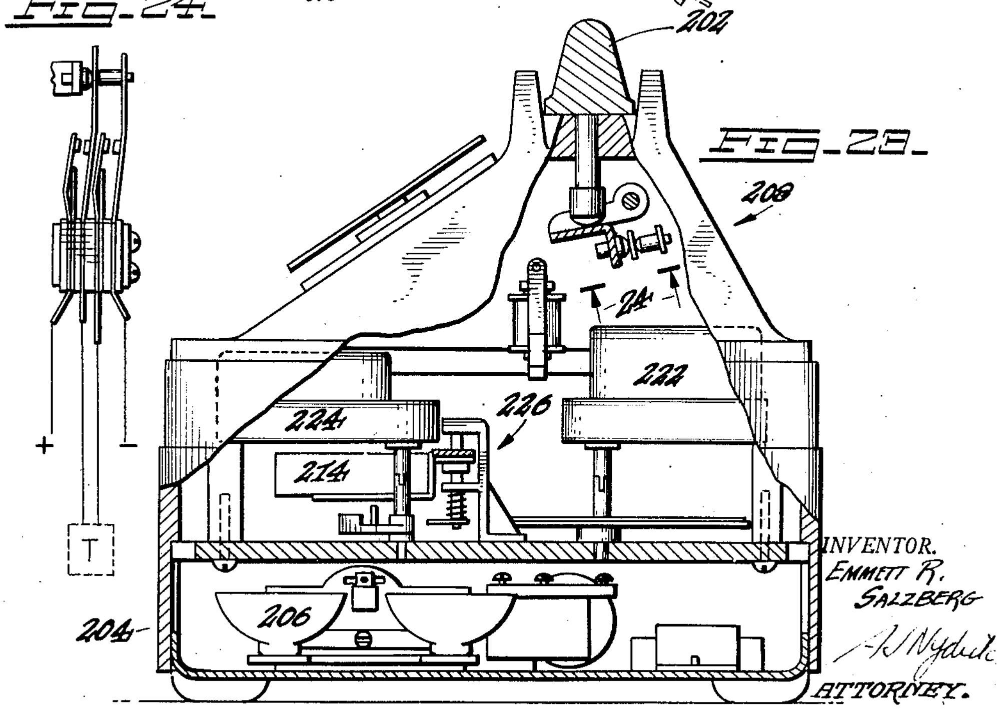
Fig. 23 is a side view of the instrument illustrated in Fig. 22, a part of the casing being broken away in order to show the internal arrangement of the components.
Fig. 24 is a sectional view of the structure illustrated in Fig. 23 taken on the line 24—24 thereof, showing the details of the construction of the internally housed switch that controls the operation of a conventional telephone.

As shown in Fig. 20 the numeral 200 designates the box which supports the hand set (shown in phantom) 202. In the lower part 204 there is the bell unit 206. In the upper part 208 of the box there is the internal switch 210 (Fig. 24). In the mid-part 212 there is positioned the speaker 214, the turntable 216, and the disc or record 218. The speaker is mounted on a bracket 220, in the manner heretofore described, so as to allow for vertical and rotational movement thereof. The turntable is suitably connected as aforedescribed to a motor 222. There is also provided a speaker reset motor 224, and a switch assembly 226, akin to the similar assembly 30. It will be noted that economy in space is achieved by positioning the speaker, speaker-reset motor, and record drive motor above the turntable.

Figure 22:
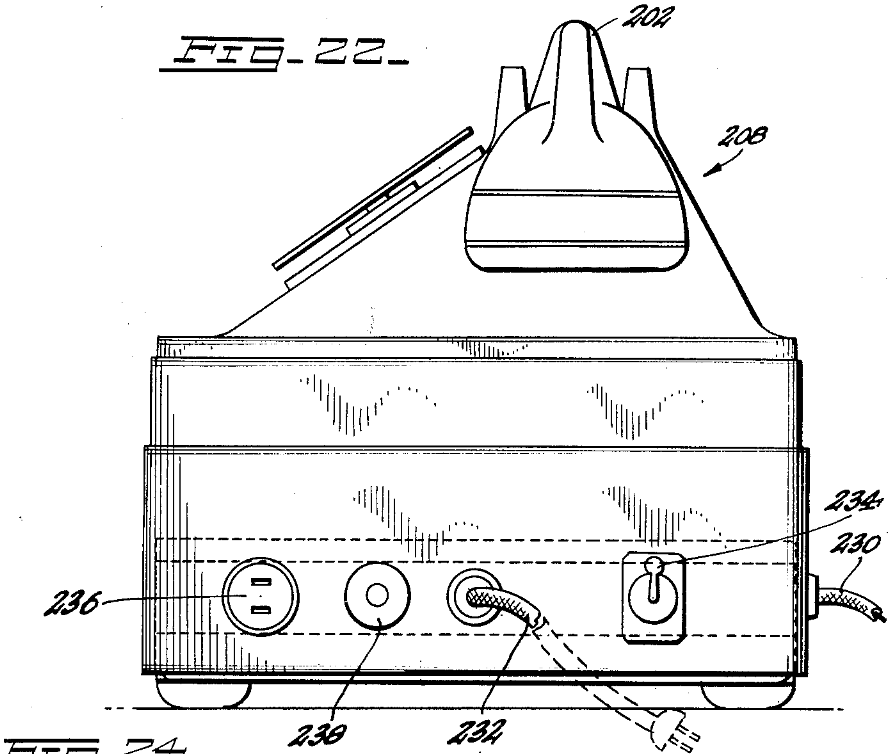
Fig. 22 is an external side view of the integrated instrument illustrated in Figs. 20 and 21.

As shown in Fig. 22, the instrument is provided with a cable 230 which is connected to the telephone line. At 232 is a cable which furnishes a supply of 110 volts A. C., such supply being controlled by switch 234. Current is fed to a recorder (not shown, but of any suitable construction as heretofore described) by connecting the same to the outlet 236. An outlet 238 is provided to receive a terminal jack plug on a line running to the voice input side of the recorder.

The device of this embodiment operates on the following principle: when there is an incoming call the bell ringing current of the instrument acts upon a relay thereby to actuate the announcing unit, and closes the telephone speaking circuit by shorting the appropriate contacts in switch 210 thus producing the same result as would be obtained by physically lifting or elevating the hand set 202. Thus the speaker reset motor and the record drive motor both start to rotate, and the announcement from the record is acoustically picked up by the mouthpiece of the hand set and carried over the open telephone line. At the same time, as heretofore described, the recorder which has been kept warm by the standby current is now supplied with full voltage by the shunting out of a resistor.

The circuit for this embodiment is shown in Fig. 32. Current is supplied from a source (110 volts, A. C.) through plug 232, controlled by switch 234. One leg of this supply is connected to point 260 on the bell current actuated by relay 262. The other point 264 is connected to one side of relay 270. The second side of 270 is connected to the source 232. 270 has four sets of contacts 272, 274, 276, and 278. When the bell ringing current in the bell line actuates relay 262 closing its contact points 260 and 264, relay 270 is activated. Thereupon contacts 272 close and allow current to flow through speaker reset motor 224, and also to flow through the record drive motor 222. After the record has made a couple of revolutions the speaker support bracket 220 is moved so that set screw 228 is moved out of contact with the blade of the switch assembly unit so that switch 226 closes. When the contacts 274 close, the resistor 280 is bypassed allowing full current to pass to the recorder via 236. When the contacts 276 and 278 close the result is to bypass the internal telephone switch 210, and thus to produce the same effect as if said switch 210 had been mechanically closed by the lifting of the hand set 202.

Figure 26:
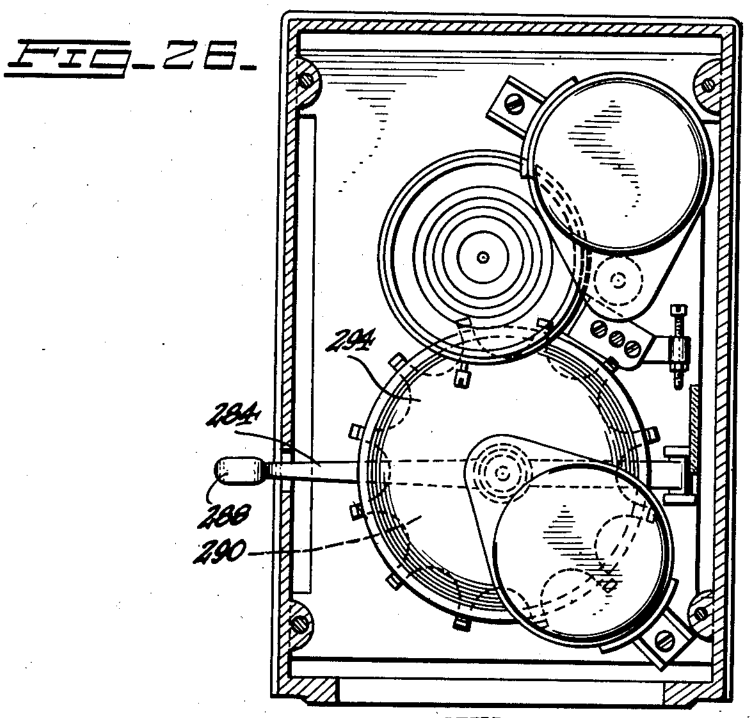
Fig. 26 is a top plan view of a telephone instrument embodying this invention showing a modified form of the phonograph turntable which can be externally manipulated in order to change the announcement record.
Figure 27:
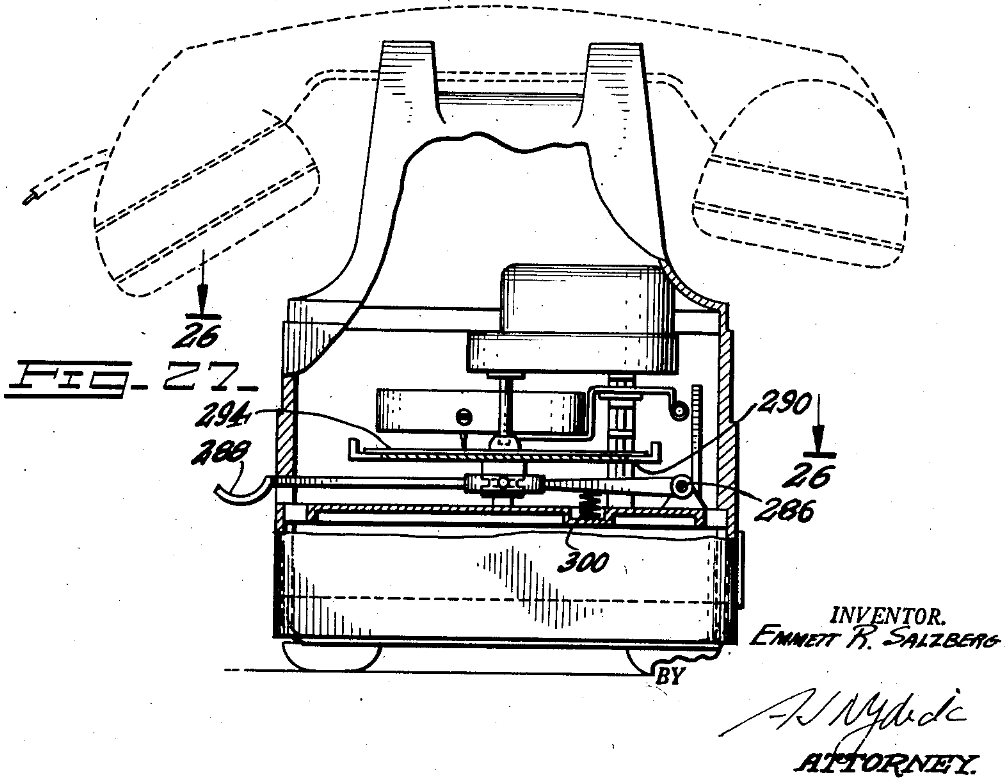
Fig. 27 is a front view of the structure shown in Fig. 26, part of the front cover being broken away to show the interior arrangement of the components.
Figure 28:
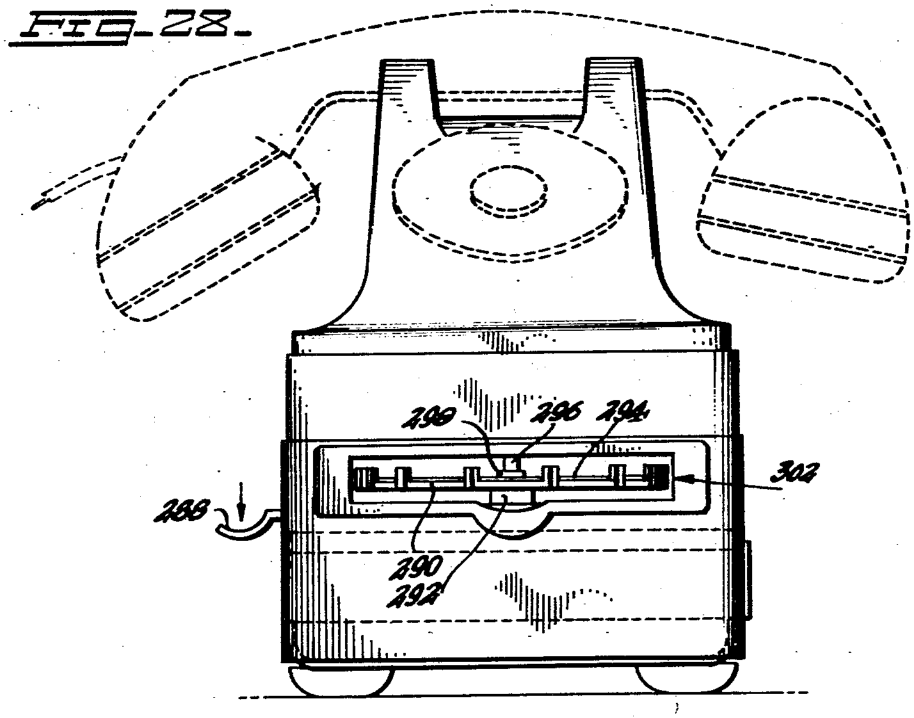
Fig. 28 is a front view of the structure illustrated in Figs. 26 and 27.
Figures 29, 30:
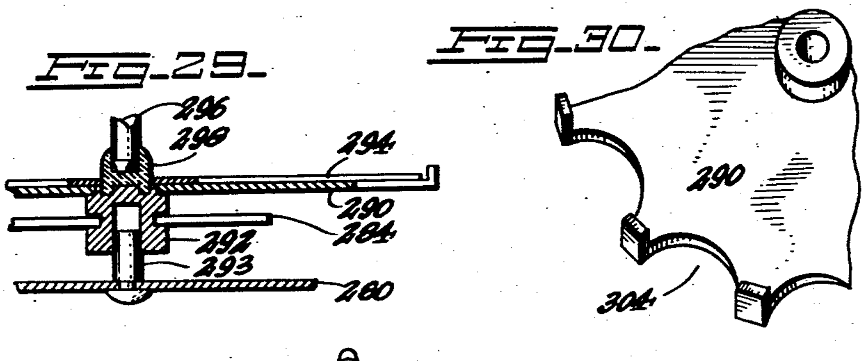
Fig. 29 is a vertical section of the axial portion of the turntable assemblage in the structure illustrated in Figs. 26–28.
Fig. 30 is a perspective view of a fragmentary portion of the turntable illustrated in Figs. 26–29.
Figure 1:
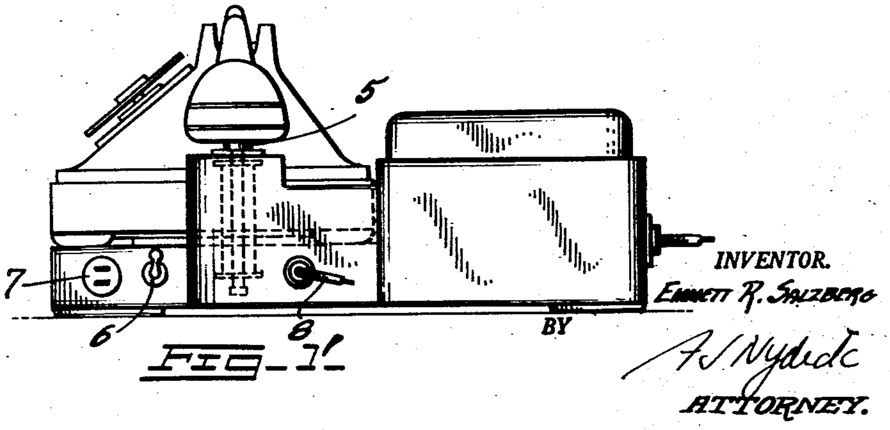
Figure 11:
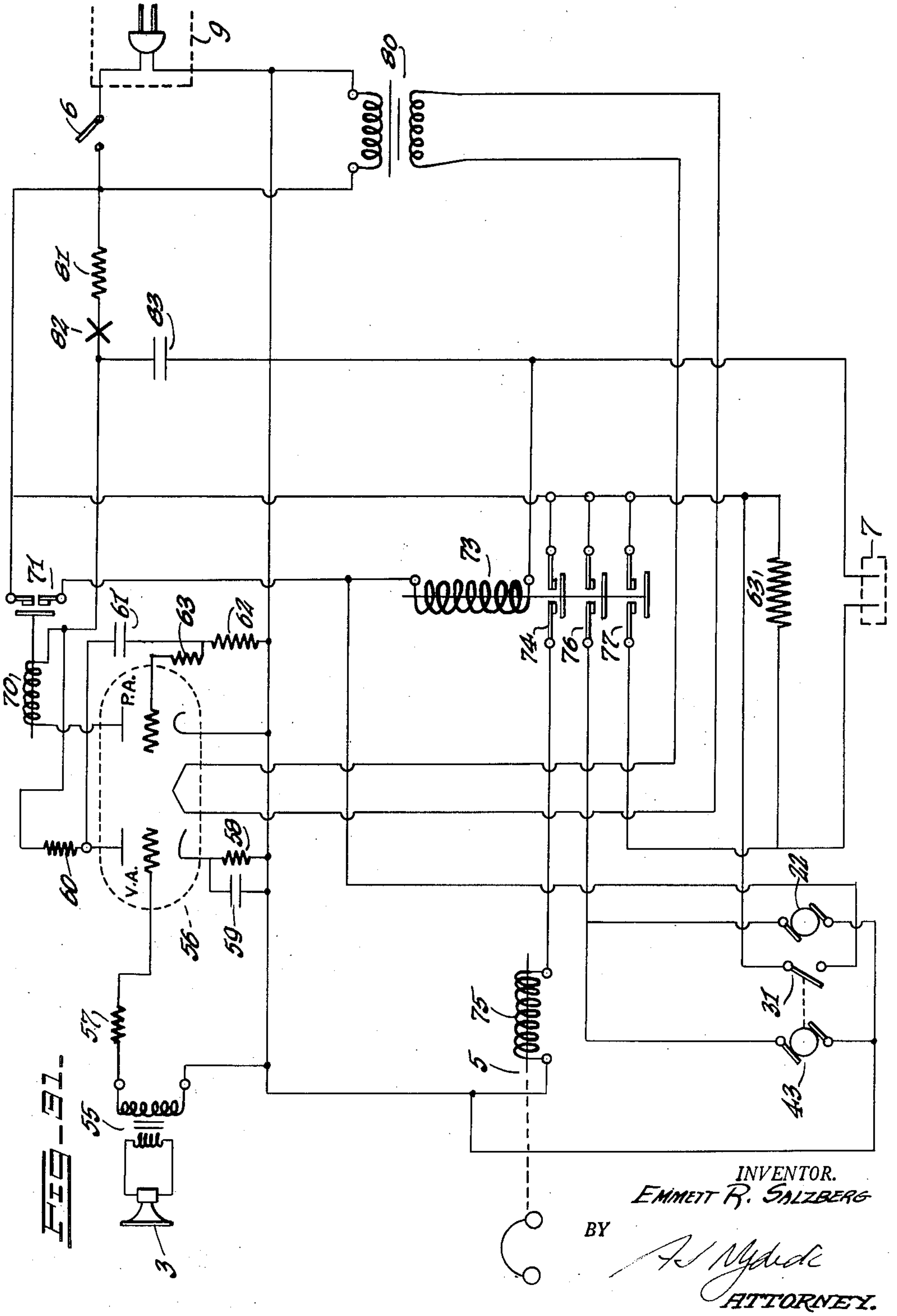
Figure 12:
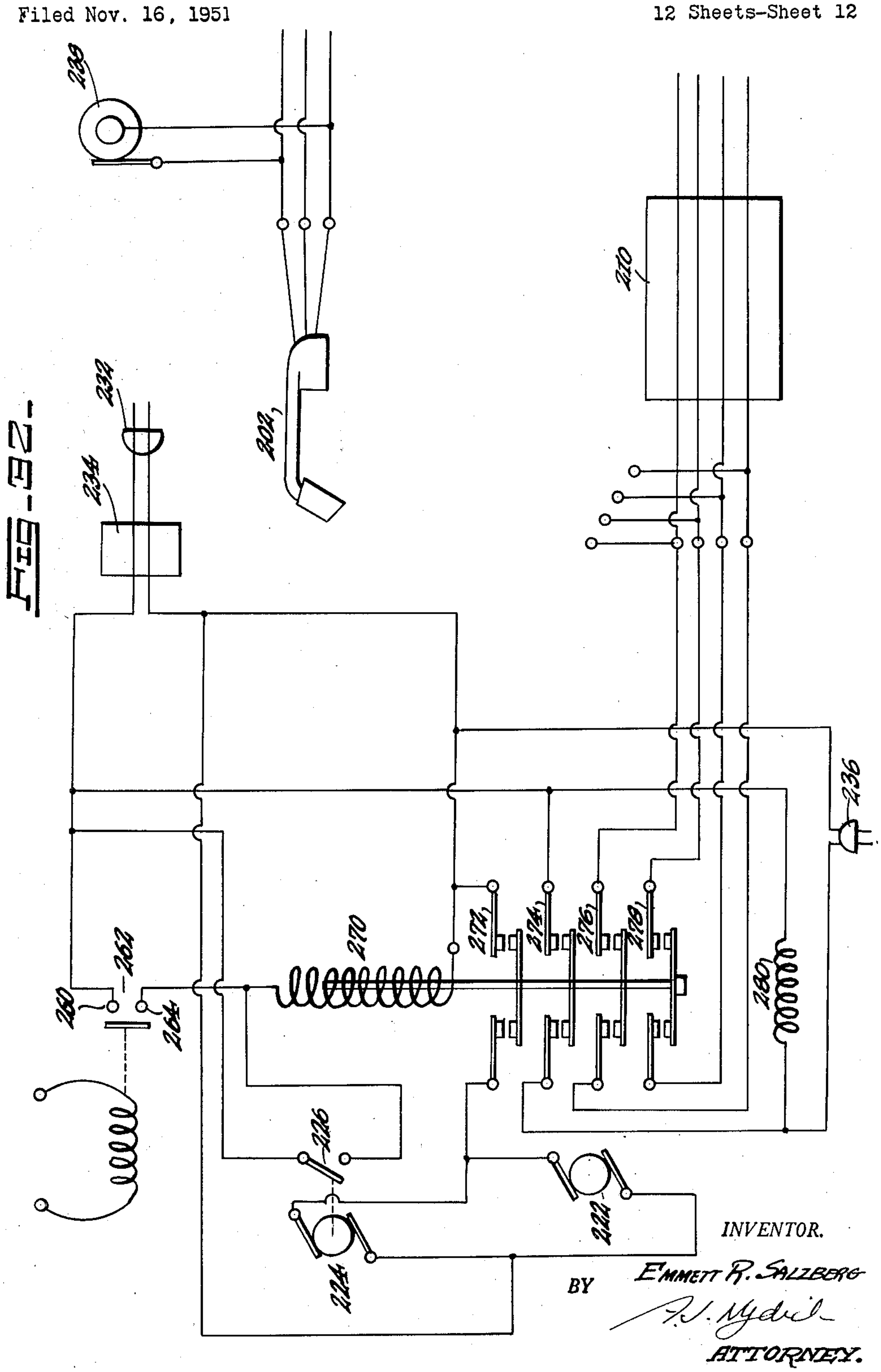

Referring to Fig. 26 and the associated views there is shown a telephone in which this invention is integrated, and in which provision is made for easily and conveniently inserting and removing a phonograph disc or record. The general arrangement of the components of this embodiment is that shown in Fig. 20 and the views associated therewith (Figs. 21–24) and the circuit is likewise the same. In this embodiment, however, the turntable is driven by a shaft from the motor through frictional engagement with the motor, shown in detail in Fig. 29.

As there shown a base plate 280 is provided with a stud 293. A lever 284 is pivoted at 286 and terminates externally of the instrument as at 288. The turntable 290 is provided on its underside with an axially disposed hub 292 which is engaged with the lever 284. This hub is axially bored and receives the stud 293. A record 294 is seated on the turntable 290. The record motor drive shaft 296 terminates in a foot 298, as of rubber or any other appropriate material, that grips the record. A spring 300 normally biases the lever 284 upwards. To insert a record into the instrument, the external end 288 of the lever is moved downwardly so as to disengage the foot 298 whereupon the record, grasped between the fingers, is introduced through the slot 302 and placed upon the turntable. Upon release of the end 288 the lever rises and the foot thereupon engages the record. To remove a record the end 288 of the lever is moved downwardly, and the record grasped by the fingers in one of the cut outs 304 of the turntable.

I provide, for example, a time cycle of one minute for announcing the absence of the telephone subscriber and recording the incoming message or intelligence, if any is to be left. The record is provided with an appropriate signal or "bleep" at 15-second intervals, thus to comply with the regulations of the Federal Communications Commission in respect of the recording of telephone conversations. For example, the record may make the following announcement:

"Hello:

The person you are calling is not at home, but this telephone is connected to a recording machine. If you would like to leave your name, telephone number and message you have forty-five seconds in which to do so. Go ahead, please."

The "bleeps" are made at the end of 15 seconds, 30 seconds, and 45 seconds. A final announcement is made about two seconds prior to the termination of the cycle, for example, as follows:

"The recording of your message will end in two seconds."

It will be obvious that this invention provides many advantages. As will have been observed the instrument is featured by marked simplicity of construction. The low cost of manufacture makes it especially valuable for use in conjunction with any appropriate electrically operated recording instrument. The device of this invention makes it possible to combine an intelligence reproducing mechanism in a telephone with but little increase in physical size. This invention is well adapted for wall installation.

It will be understood that the foregoing description of the invention, the embodiments and sub-combinations thereof illustrated are illustrative of the principles of this invention; and, accordingly, that the appended claims are to be construed as defining the invention within the full spirit and scope thereof:

I claim:

1. An electric control system for controlling apparatus adapted to answer a telephone and record a message, the said system comprising electrically actuated elevating means for lifting the hand set of a telephone receiving system, electric drive means for an intelligence reproducing device, circuit means adapted to be connected with a message recording device, electrically actuated timing means responsive to energization of the telephone bell for maintaining the recording device operation during said interval of time, a first electro-magnetic switch means including first contact means connected in circuit with said elevating means for the control of the same, second contact means connected in circuit with said drive means and said timing means in parallel connection, and third contact means connected in circuit with said circuit means for controlling the said intelligence recording means, all the said contact means being in normally open positions until the said switch means are de-energized, second electro-magnetic switch means connected in an energizing circuit with said first switch means, and sound sensitive electric control means connected in circuit with said second electro-magnetic switch means for energizing the same to provide reception of sound signals by said sound sensitive means, energization of said second switch means closing said energized circuit for said first switch means.

2. An electric control system for controlling apparatus adapted to answer a telephone and record a message, the said system comprising electrically actuated elevating means for lifting the hand set of a telephone receiving system, electric drive means for an intelligence reproducing device means for feeding an incoming telephone message into an intelligence recording device, electrically actuated timing means responsive to energization of the telephone bell for maintaining the recording device operation during a set interval of time, a first electro-magnetic switch means including first contact means connected in circuit with said elevating means for the control of the same, second contact means connected in circuit with said drive means and said timing means in parallel connection, and third contact means connected in circuit with said circuit means for controlling the said intelligence recording means, all the said contact means being arranged to be in circuit disconnecting positions when the said switch means are de-energized, second electro-magnetic switch means connected in an energizing circuit with said first switch means, and sound sensitive electric control means connected in circuit with said second electro-magnetic switch means for energizing the same to provide reception of sound signals by said sound sensitive means, energization of said second switch means closing said energized circuit for said first switch means.

3. An electric control system for controlling apparatus adapted to answer a telephone and record a message, the said system comprising a first electro-magnetic switch means responsive to the energizing current that actuates the telephone bell, electric drive means for an intelligence reproducing device, circuit means for connecting the telephone line with a message recording device, a second electro-magnetic switch means connected in circuit with the first electro-magnetic switch means, said second switch means including first contact means connected in circuit with said drive means and a timing means in parallel connection, second contact means connected in circuit with said circuit means for controlling the said intelligence recording means, third contact means connected in circuit with one leg of the telephone line, and fourth contact means connected in circuit with the second leg of the telephone line, all the contact means of both of said switches being in circuit disconnecting position when they are de-energized, the aforesaid timing means holding the aforesaid second electro-magnetic switch means in energized position after the first electro-magnetic switch means is de-energized.

4. An electric control system for controlling apparatus adapted to answer a telephone and record a message, the said system comprising a first electro-magnetic switch means responsive to the energizing current that actuates the telephone bell, electric drive means for an intelligence reproducing device, a second electro-magnetic switch means connected in circuit with the first electro-magnetic switch means, said second switch means including first contact means connected in circuit with said drive means and a timing means in parallel connection, second contact means connected in circuit with said circuit means for controlling the said intelligence recording means, third contact means connected in circuit with one leg of the telephone line, and fourth contact means connected in circuit with the second leg of the telephone line, all the contact means of both of said switches being in circuit disconnecting position when they are de-energized, the aforesaid timing means holding the aforesaid second electro-magnetic switch means in energized position after the first electro-magnetic switch is de-energized.

5. An electric control system for controlling apparatus adapted to answer a telephone and record a message, the said system comprising a first electro-magnetic switch means responsive to the energizing current that actuates the telephone bell, electric drive means for an intelligence reproducing device, circuit means for connecting the telephone line with a message recording device, a second electro-magnetic switch means connected in circuit with the first electro-magnetic switch means, said second switch means including first contact means connected in circuit with said drive means and a timing means in parallel connection, said timing means comprising electric drive means and a switch means, a second contact means connected in circuit with said circuit means for controlling the said intelligence recording means, third contact means connected in circuit with one leg of the telephone line, and fourth contact means connected in circuit with the second leg of the telephone line, all the contact means of both of said switches being in circuit disconnecting position when they are de-energized, the aforesaid timing means holding the aforesaid second electro-magnetic switch means in energized position after the first electro-magnetic switch means is de-energized.

6. An electric control system for controlling apparatus adapted to answer a telephone and record a message, the said system comprising a first electro-magnetic switch means responsive to the energizing current that actuates the telephone bell, electric drive means for an intelligence reproducing device, a second electro-magnetic switch means connected in circuit with the first electro-magnetic switch means, said second switch means including first contact means connected in circuit with said drive means and a timing means in parallel connection, said timing means comprising electric drive means and a switch means, second contact means connected in circuit with said circuit means for controlling the said intelligence recording means, third contact means connected in circuit with one leg of the telephone line, and fourth contact means connected in circuit with the second leg of the telephone line, all the contact means of both of said switches being in circuit disconnecting position when they are de-energized, the aforesaid timing means holding the aforesaid second electro-magnetic switch means in energized position after the first electro-magnetic switch means is de-energized.

7. An electric control system for controlling apparatus adapted to answer a telephone and record a message, the said system comprising a first electro-magnetic switch means responsive to the energizing current that actuates the telephone bell, electric drive means for an intelligence reproducing device, circuit means for connecting the telephone line with a message recording device, a second electro-magnetic switch means connected in circuit with the first electro-magnetic switch means, said second switch means including (*a*) contact means connected in circuit with said drive means and a timing means in parallel connection, (*b*) contact means connected in circuit with one leg of the telephone line, and (*c*) contact means connected in circuit with the second leg of the telephone line, all the contact means of both of said switches being in circuit disconnecting position when they are de-energized, the aforesaid second electro-magnetic switch means being in energized position after the first electro-magnetic switch means is de-energized.

8. An electric control system for controlling apparatus adapted to answer a telephone and record a message, the said system comprising a first electro-magnetic switch means responsive to the energizing current that actuates the telephone bell, electric drive means for an intelligence reproducing device, circuit means adapted to connect the telephone line with a message recording device, a second electro-magnetic switch means connected in circuit with the first electro-magnetic switch means, said second switch means including (*a*) first contact means connected in circuit with said drive means and a timing means in parallel connection, and (*b*) two sets of contact means each connected respectively in circuit with the circuit controlling poles of the internal switch of the telephone, all the contact means of both of said switches being in circuit disconnecting position when they are de-energized, the aforesaid timing means holding the aforesaid second electro-magnetic switch means in energized position after the first electro-magnetic switch means is de-energized.

References Cited in the file of this patent

UNITED STATES PATENTS

| | | |
|---|---|---|
| 1,778,980 | McKeldin et al. | Oct. 21, 1930 |
| 1,973,081 | Keiser | Sept. 11, 1934 |
| 2,261,420 | Shiveley et al. | Nov. 4, 1941 |
| 2,374,842 | Shively et al. | May 1, 1945 |
| 2,505,264 | Van Der Woude | Apr. 25, 1950 |
| 2,539,139 | Jordanoff et al. | Jan. 23, 1951 |
| 2,547,725 | Thompson | Apr. 3, 1951 |
| 2,549,548 | Von Zimmermann | Apr. 17, 1951 |